United States Patent
Satou et al.

(10) Patent No.: US 8,762,665 B2
(45) Date of Patent: Jun. 24, 2014

(54) SWITCH APPARATUS STORING INFORMATION INDICATING ACCESS OF HOSTS TO VIRTUAL STORAGE AREAS

(75) Inventors: Akira Satou, Kawasaki (JP); Kenichi Fujita, Kawasaki (JP); Koutarou Sasage, Kawasaki (JP); Atsushi Masaki, Kawasaki (JP); Hiroshi Shiomi, Kawasaki (JP); Masakazu Sakamoto, Kawasaki (JP); Takuya Kurihara, Kawasaki (JP); Toshiaki Takeuchi, Kawasaki (JP); Atsushi Shinohara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 953 days.

(21) Appl. No.: 12/542,927

(22) Filed: Aug. 18, 2009

(65) Prior Publication Data
US 2010/0058014 A1 Mar. 4, 2010

(30) Foreign Application Priority Data

Aug. 29, 2008 (JP) ................................ 2008-222575

(51) Int. Cl.
*G06F 3/06* (2006.01)
(52) U.S. Cl.
CPC ............ *G06F 3/0622* (2013.01); *G06F 3/0637* (2013.01); *G06F 3/0646* (2013.01); *G06F 3/0665* (2013.01); *G06F 3/067* (2013.01)
USPC ..... 711/162; 711/163; 711/173; 711/E12.096
(58) Field of Classification Search
None
See application file for complete search history.

(56) References Cited

U.S. PATENT DOCUMENTS

| | | | |
|---|---|---|---|
| 5,964,886 A | 10/1999 | Slaughter et al. | |
| 6,161,191 A | 12/2000 | Slaughter et al. | |
| 6,173,413 B1 | 1/2001 | Slaughter et al. | |
| 6,421,787 B1 | 7/2002 | Slaughter et al. | |
| 6,690,400 B1 * | 2/2004 | Moayyad et al. | 715/779 |
| 6,704,836 B1 * | 3/2004 | Griswold et al. | 711/113 |
| 7,165,157 B2 * | 1/2007 | Eguchi et al. | 711/163 |
| 7,428,642 B2 * | 9/2008 | Osaki | 713/189 |

(Continued)

FOREIGN PATENT DOCUMENTS

| | | |
|---|---|---|
| JP | 2002-514813 | 5/2002 |
| JP | 2006-114029 | 4/2006 |
| JP | 2007-533030 | 11/2007 |

OTHER PUBLICATIONS

Tim Thomas. "A Mandatory Access Control Mechanism for the UNIX File System." Dec. 1988. IEEE. Aerospace Computer Security Applications Conference 1998. pp. 173-177.*

(Continued)

*Primary Examiner* — Nathan Sadler
(74) *Attorney, Agent, or Firm* — Staas & Halsey LLP

(57) ABSTRACT

A switch connectable between hosts and storage device, the switch for providing a service of allotting virtual areas to be deployed in the storage device to any of the hosts upon demand, the switch includes: a processor for controlling allotment of virtual areas to the hosts and allocation of physical areas of the storage device to the virtual areas; and a memory for storing information of the host allowed access to the virtual areas, the processor controlling access by any of the hosts to the virtual area so as to restrict access by any of the hosts to a part of the virtual areas allotted to the any of the hosts in reference to the memory.

8 Claims, 13 Drawing Sheets

(56) References Cited

U.S. PATENT DOCUMENTS

| | | | |
|---|---|---|---|
| 7,469,274 B1* | 12/2008 | Ryu et al. | 709/214 |
| 8,032,701 B1* | 10/2011 | Glade et al. | 711/114 |
| 8,478,952 B1* | 7/2013 | Armorer | 711/162 |
| 2001/0020254 A1* | 9/2001 | Blumenau et al. | 709/229 |
| 2001/0047482 A1* | 11/2001 | Harris et al. | 713/200 |
| 2004/0230704 A1* | 11/2004 | Balasubramanian et al. | 709/253 |
| 2005/0008016 A1* | 1/2005 | Shimozono et al. | 370/392 |
| 2005/0177539 A1* | 8/2005 | Goodwin | 707/1 |
| 2005/0223167 A1* | 10/2005 | Nishimoto et al. | 711/113 |
| 2005/0228835 A1 | 10/2005 | Roa | |
| 2006/0010150 A1* | 1/2006 | Shaath et al. | 707/102 |
| 2007/0067589 A1* | 3/2007 | Mishra et al. | 711/163 |
| 2008/0244196 A1* | 10/2008 | Shitomi et al. | 711/147 |
| 2008/0263306 A1* | 10/2008 | Tanizawa | 711/170 |
| 2009/0094620 A1* | 4/2009 | Kalwitz et al. | 719/325 |

OTHER PUBLICATIONS

Japanese Patent Office Action dated May 25, 2010 in corresponding Japanese Patent Application No. 2008-222475.

* cited by examiner

VIRTUAL CABINET CONFIGURATION INFORMATION TABLE

| BYTES | 0 | 1 | 2 | 3 | 4 | 5 | 6 | 7 |
|---|---|---|---|---|---|---|---|---|
| 00h | serialID(8 bytes) | | | | | | | |
| 08h | RESERVED | | | | | | | |
| 10h | maxSession(4 bytes) | | | | RESERVED | | | |
| 18h | entryCount(4 bytes) | | | | RESERVED | | | |
| 20h | allowedSID(8bytes × entryCount) | | | | | | | |
| ⋮ | | | | | | | | |

MAX TOTAL SIZE = 16416 BYTES

FIG. 5

DESCRIPTION OF VIRTUAL CABINET CONFIGURATION INFORMATION PARAMETERS

| ITEM | TYPE | CONTENT |
|---|---|---|
| serialID | [char(8)] | VIRTUAL CABINET IDENTIFIER |
| maxSession | [uint32_t] | MAXIMUM NUMBER OF ACTUATABLE SESSIONS<br>INITIAL VALUE = FFFFFFFFh |
| entryCount | [uint32_t] | ENTRY COUNT IN REMOTE COPY ALLOWED VIRTUAL CABINET LIST<br>INITIAL VALUE = 0<br>MAXIMUM VALUE = 1024 |
| allowedSID | [char(8)]<br>×entryCount | REMOTE COPY ALLOWED VIRTUAL CABINET INFORMATION LIST |

FIG. 6

REMOTE COPY ALLOWED VIRTUAL CABINET INFORMATION TABLE
(DETAILS OF allowedSID)

| BYTES | 0 | 1 | 2 | 3 | 4 | 5 | 6 | 7 |
|---|---|---|---|---|---|---|---|---|
| 00h | \multicolumn{8}{c}{serialID} | | | | | | | |

TOTAL SIZE = 8 BYTES

FIG. 8

| REC COMMAND RECEPTION SIDE | REC DESTINATION | | | |
|---|---|---|---|---|
|  | VIRTUAL CABINET A | VIRTUAL CABINET B | VIRTUAL CABINET C | VIRTUAL CABINET S |
| VIRTUAL CABINET A | — | ○ | × | × |
| VIRTUAL CABINET B | ○ | — | × | × |
| VIRTUAL CABINET C | × | × | — | × |
| VIRTUAL CABINET S | ○ | ○ | ○ | — |

FIG. 12

| REC COMMAND RECEPTION SIDE | | REC DESTINATION | | | |
|---|---|---|---|---|---|
| | | VIRTUAL CABINET A | VIRTUAL CABINET B | VIRTUAL CABINET C | VIRTUAL CABINET S |
| VIRTUAL CABINET A | FROM RECEPTION SIDE TO DESTINATION SIDE | — | × | × | × |
| | FROM DESTINATION SIDE TO RECEPTION SIDE | — | ○ | × | × |
| VIRTUAL CABINET B | FROM RECEPTION SIDE TO DESTINATION SIDE | ○ | — | × | × |
| | FROM DESTINATION SIDE TO RECEPTION SIDE | ○ | — | × | × |
| VIRTUAL CABINET C | FROM RECEPTION SIDE TO DESTINATION SIDE | × | × | — | × |
| | FROM DESTINATION SIDE TO RECEPTION SIDE | × | × | — | × |
| VIRTUAL CABINET S | FROM RECEPTION SIDE TO DESTINATION SIDE | ○ | ○ | ○ | — |
| | FROM DESTINATION SIDE TO RECEPTION SIDE | ○ | ○ | ○ | — |

FIG. 13

REMOTE COPY ALLOWED VIRTUAL CABINET INFORMATION TABLE
(DETAILS OF allowedSID)

| BYTES | 0 | 1 | 2 | 3 | 4 | 5 | 6 | 7 |
|---|---|---|---|---|---|---|---|---|
| 00h | \multicolumn{8}{c}{serialID} |
| 08h | dir | | | | | | | |

TOTAL SIZE = 16 BYTES

FIG. 14

DESCRIPTION OF REMOTE COPY ALLOWED
VIRTUAL CABINET INFORMATION PARAMETERS

| ITEM | TYPE | CONTENT |
|---|---|---|
| serialID | [char(8)] | VIRTUAL CABINET IDENTIFIER |
| dir | [uint8_t] | VALUE 0: ALLOWED IN BOTH DIRECTION<br>VALUE 1: DISALLOWED IN TRANSMISSION DIRECTION<br>VALUE 2: DISALLOWED IN RECEPTION DIRECTION |

SWITCH APPARATUS STORING INFORMATION INDICATING ACCESS OF HOSTS TO VIRTUAL STORAGE AREAS

CROSS-REFERENCE TO RELATED APPLICATION

This application is based upon and claims the benefit of priority of the prior Japanese Patent Application No. 2008-222475, filed on Aug. 29, 2008 the entire contents of which are incorporated herein by reference.

FIELD

The embodiment discussed herein is related to a switch apparatus for transferring data from one device to another.

BACKGROUND

Generally, there is known a switch apparatus that virtualizes a storage in a network layer (switch layer) and that provides a user with virtual disks independent of type of host or storage. Such the switch apparatus (hereinafter virtualized switch) provides a virtualized disk function and a copy function as main functions.

Here, the term "virtualized disk function" refers to a function of freely allotting a real disk from a storage device and allocating it to the host, as a virtual disk. The term "copy function" refers to a function of performing a copy from a virtual disk to another virtual disk using only resources in the virtualized switch without using resources (CPU or memory) in the host. Related-art examples include U.S. Pat. No. 5,964,886, U.S. Pat. No. 6,173,413, U.S. Pat. No. 6,161,191, U.S. Pat. No. 6,421,787, and U.S. Publication No. US2005/0228835.

As a solution utilizing the virtualized switch, there is a COD (capacity on demand) service. As exemplified in FIG. 16, the COD service utilizing the virtualized switch includes one COD center providing the COD service and managing the entire storage system, and a plurality of users utilizing the COD service. In the COD service, virtual disks prepared by a management center are lent out to each user by an amount commensurate with needed areas.

The management center prepares, also in itself, virtual disks of a capacity equal to or more than that of the virtual disks lent out to the user, to thereby perform backup or restoration of the virtual disks lent to the user.

An example illustrated in FIG. 16 is a case wherein a virtual disk 1 and a virtual disk 2 are lent out to a user 1, and a virtual disk 3 and a virtual disk 4 are lent out to a user 2. The virtual disk 1 is linked to a virtual target A, the virtual disk 2 to a virtual target B, and the virtual disks 3 and 4 to virtual targets C. Moreover, the management center prepares, in its own side, virtual disks 1' to 4' as backup/restoration disks for the virtual disks lent out to the users.

The virtualized switch provides a function of copying from a virtual disk to another virtual disk. The copy function is performed under an instruction from the COD center side or an instruction from the user side.

The case wherein a copy is performed under an instruction from the user side will be described using the example in FIG. 16. The user 1 usually performs a copy between the virtual disk 1 and the virtual disk 2 (a copy from the virtual disk 1 to the virtual disk 2, or a copy from the virtual disk 2 to the virtual disk 1), the copy having been allocated to the user 1 itself. The COD center side performs backup or restoration in the same system, as a COD service.

In operating the COD utilizing the above-described virtualized switch, the COD center and a plurality of users share the use of one system among them. This can raise a security problem. For example, when a user executes a copy information (copy session information list) acquisition command that is being executed in a system, the user can acquire an REC copy session information list (in the example in FIG. 16, a copy from the virtual disk 2 to the virtual disk 1) that have been actuated by the user itself.

Furthermore, when the user executes a copy session information list acquisition command that is being executed in the system, the user can even go so far as to acquire an REC copy session information list that have been actuated by the COD center (in the example in FIG. 16, a copy from the virtual disk 1 to the virtual disk 1', a copy from the virtual disk 1' to the virtual disk 1, a copy from the virtual disk 2 to the virtual disk 2', and a copy from the virtual disk 2' to the virtual disk 2.)

The copy session information list that has been acquired in this way includes information on a virtual cabinet S. This has caused a potential security problem in that the information on the virtual cabinet S may be abused to copy content of another user's virtual disks to the user's own virtual disks, to thereby leak the information; and also has raised a possible problem that content of the user's own virtual disks may be written over another user's virtual disks to thereby destroy data of the other user.

Moreover, in operating the COD utilizing the above-described virtualized switch, in addition to the case wherein the information is abused, there have been an potential issue that content of another user's virtual disks are erroneously copied to the user's own disks by a faulty operation of the user to thereby leak the information, and an issue that content of the user' own virtual disks are erroneously written over another user's virtual disks to thereby destroy data of the other user.

SUMMARY

According to an aspect of the invention, a switch apparatus connectable between a plurality of hosts and at least one storage device, the switch apparatus for providing a service of allotting virtual storage areas to be deployed in the at least one storage device to any of the hosts upon demand, the switch apparatus includes: a processor for controlling allotment of virtual storage areas to the hosts and allocation of physical storage areas of the at least one storage device to the virtual storage areas; and a memory for storing information of the host allowed access to the virtual storage areas, the processor controlling access by any of the hosts to the at least one virtual area so as to restrict access by any of the hosts to a part of the virtual areas allotted to the any of the hosts in reference to the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram explaining virtual cabinet configuration information parameters.

FIG. 6 is a diagram explaining a remote copy allowed virtual cabinet information list.

FIG. 8 is another diagram explaining copy control processing by the switch according to the first embodiment.

FIG. 12 is another diagram explaining copy control processing by the switch according to the second embodiment.

FIG. 13 is a diagram explaining a remote copy allowed virtual cabinet information list.

FIG. 14 is a diagram explaining a remote copy allowed virtual cabinet information parameters.

DESCRIPTION OF EMBODIMENTS

Preferred embodiments of the present invention will be explained with reference to accompanying drawings.

In the following example, the configuration of a switch (switch apparatus) and the flow of processing operations according to a first embodiment of the present invention are described in this order, and lastly effects of the first embodiment are explained.

[Configuration of Switch]

Figure 1:
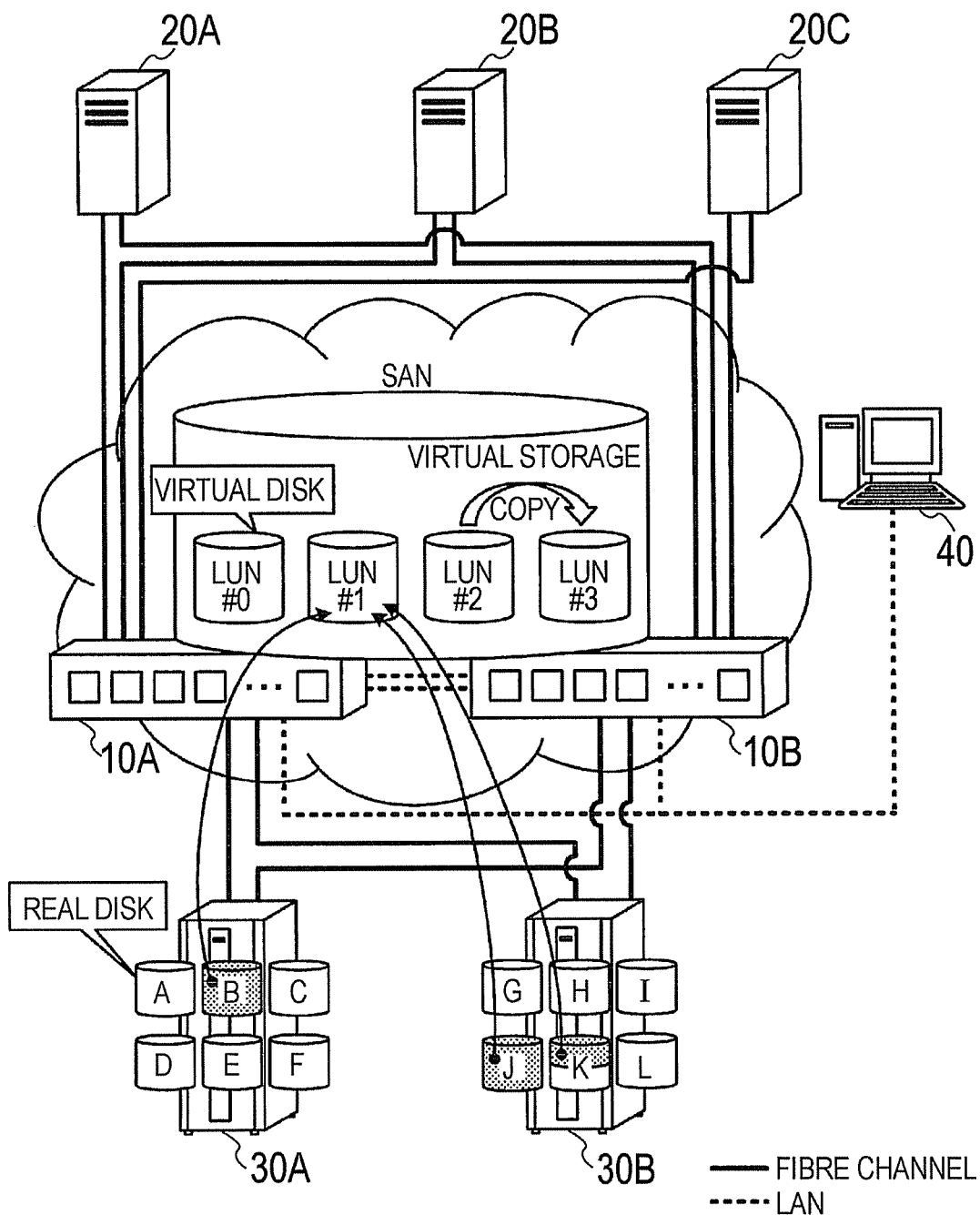
FIG. 1 is a diagram illustrating the configuration of a storage system including switches according to a first embodiment of the present invention.
Figure 2:
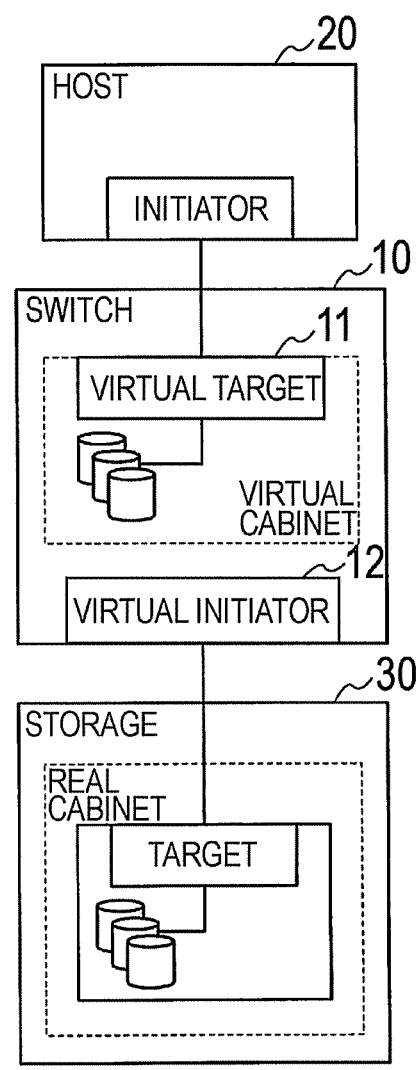
FIG. 2 is a diagram explaining access to virtual disks.
Figures 3, 4:
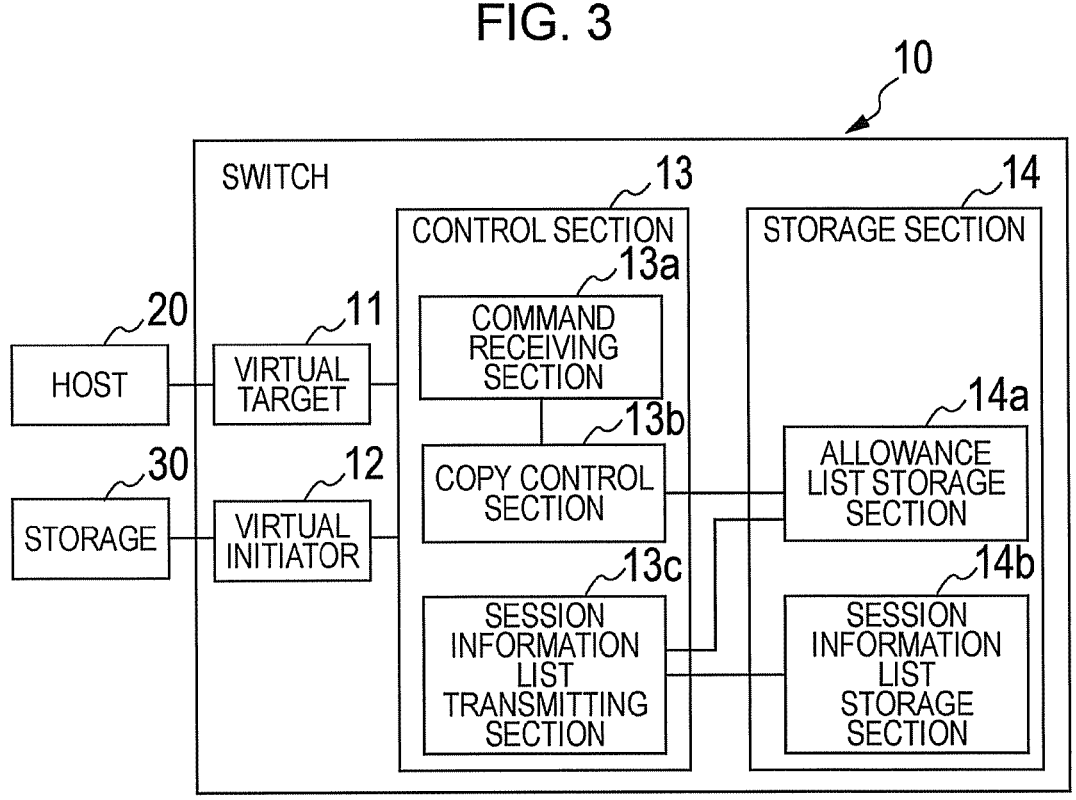
FIG. 3 is a block diagram illustrating the configuration of the switch according to the first embodiment.
FIG. 4 is a diagram explaining an allowance list.
Figure 7:
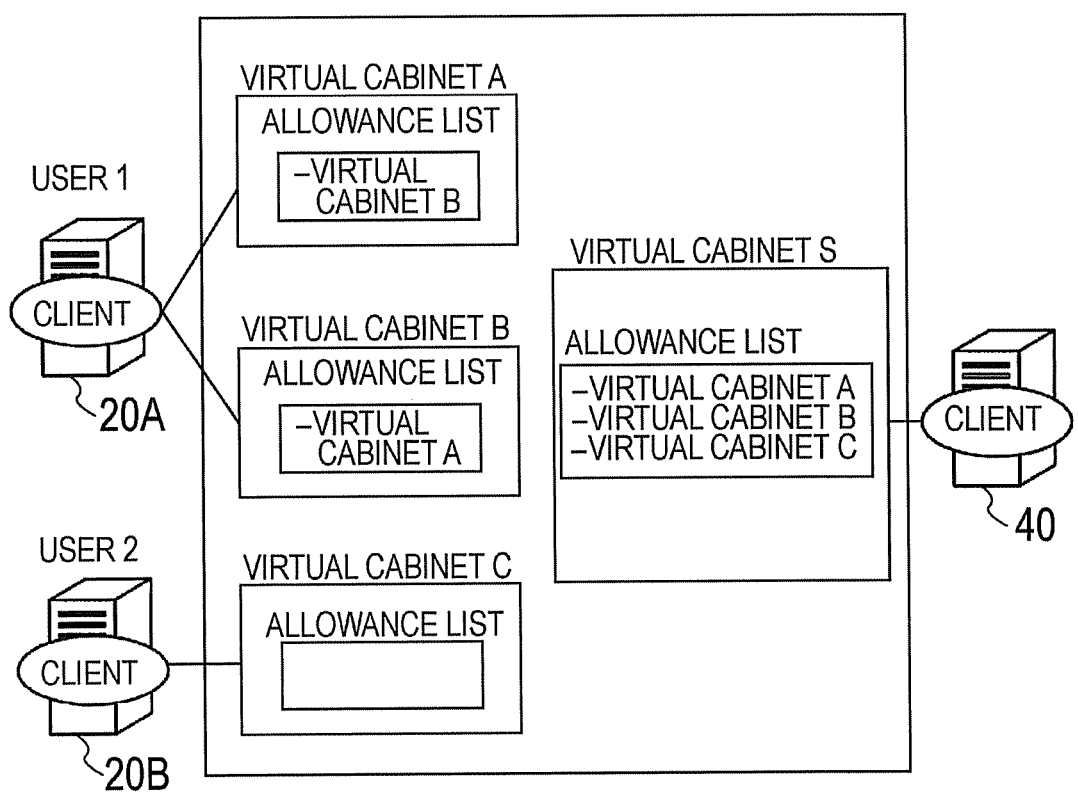
FIG. 7 is a diagram explaining copy control processing by the switch according to the first embodiment.

First, the configuration of the switch according to the first embodiment is described with reference to FIGS. 1 to 8. FIG. 1 is a diagram illustrating the configuration of a storage system including switches according to the first embodiment. FIG. 2 is a diagram explaining access to virtual disks. FIG. 3 is a block diagram illustrating the configuration of the switch according to the first embodiment. FIG. 4 is a diagram explaining an allowance list. FIG. 5 is a diagram explaining virtual cabinet configuration information parameters. FIG. 6 is a diagram explaining a remote copy allowed virtual cabinet information list. FIG. 7 is a diagram explaining copy control processing by the switch according to the first embodiment. FIG. 8 is a diagram explaining copy control processing by the switch according to the first embodiment.

As exemplified in FIG. 1, the storage system including the switches 10 according to the first embodiment includes a plurality of switches 10A and 10B, a plurality of hosts 20A, 20B and 20C, a plurality of storages (storage device) 30A and 30B, and a COD center 40. The COD center 40 may provide a service of allotting virtual disks (virtual storage areas) to be deployed in said at least one storage device to any of the hosts upon demand.

As illustrated in FIG. 1, in the storage system, the storages 30 are virtualized in a network layer (switch layer) and user is provided with virtual disks independent of types of the hosts 20 or those of the storages 30.

The switches 10A and 10B freely allot real disks from the storages 30, and allocate virtual disks (LUN #0 to #3) to the hosts 20. In the example in FIG. 1, a real disk "B" in the storage 30A, a real disk (physical disk or physical storage area) "J" in the storage 30B, and a part of a real disk "K" therein are virtualized as a virtual disk (LUN #1). The real disks are hidden from view of the hosts 20A, 20B, and 20C, while virtual disks are made visible to the hosts 20. Hence, it follows that disks used by the hosts are the virtual disk LUN #1. The hosts may directly access the at least one virtual storage area or access the at least one virtual storage area via the COD.

Upon receipt of an instruction from the COD center 40 or a copy execution command from the host 20, the switches 10A and 10B performs a copy from a virtual disk to another virtual disk using only resources in the switches 10.

Here, access to the virtual disks is described with respect to FIG. 2. As illustrated in FIG. 2, the switch 10 creates a virtual target as a target to which the host is to access, and links virtual disks as its subordinates.

That is, the target for accessing the virtual disks becomes a virtual target linked to the accessed virtual disks. The virtualized switch has a concept of a "virtual cabinet". Here, the virtual cabinet can be freely defined, and it has therein the virtual target. Furthermore, the switch 10 has also a virtual initiator, which gets access to a target in the storage 30.

Next, the configuration of the switch 10 according to the first embodiment is described with reference to FIG. 3. As illustrated in FIG. 3, the switch 10 includes the virtual target 11, the virtual initiator 12, a control section 13, and a storage section 14. Hereinbelow, processing with respect to these sections will be explained.

The virtual target 11 controls communications concerning various pieces of information exchanged with the host 20 connected therewith. Specifically, the virtual target 11 receives a copy execution command or a session information list acquisition list, from the host 20. The virtual target 11 also notifies the host 20 of the start of copy and the end thereof, or transmits a session information list to the host 20. The term "session information list acquisition command" as used herein, is a command issued upon specifying a virtual disk on which a user wants to acquire information.

The virtual initiator 12 controls communications concerning various pieces of information exchanged with the storage 30 connected therewith. Specifically, the virtual target 12 performs transmission/reception of data in real disks in the storage 30.

The storage section (memory) 14 stores data and programs for executing various processes in the control section 13. The storage section 14 may store information of the host allowed access to the virtual storage areas by the service. In particular, as what are closely related to the present invention, the storage section 14 includes an allowance list storage section 14a and a session information list storage section 14b.

The allowance list storage section 14a stores an allowance lists each storing virtual cabinets to which copies are allowed, and copy session upper limit values each indicative of a number of copies that can be executed in parallel. Specifically, the allowance list storage section 14a stores a virtual cabinet configuration table indicative of information on virtual cabinets.

As illustrated in FIG. 4, as parameters for the virtual cabinet configuration table, the allowance list storage section 14a stores serial IDs (serialID), copy session upper limit values (maxSession), entry counts (entryCount), and allowance lists (allowedSID) in the virtual cabinet configuration table.

Here, with reference to FIG. 5, description is made of each parameter in the virtual cabinet configuration table stored in the allowance list storage section 14a. The serial ID (serialID) is an identifier that uniquely identifies a virtual cabinet. The copy session upper limit value (maxSession) is a number of copies that can be actuated by each virtual cabinet, and is a maximum actuatable session number indicative of an upper limit value of the number of copies executable in parallel between allowed virtual cabinets.

The entry count (entryCount) is a remote copy allowed virtual cabinet list entry count indicative of an entry count of virtual cabinets to which copy is allowed under an instruction from the host 20. In the example in FIG. 5, the remote copy allowed virtual cabinet list entry number has an initial value of "0", and a maximum value of "1024".

The allowance list (allowedSID) is a remote copy allowed virtual cabinet information list indicative of a list of virtual cabinets to which copy is allowed. As illustrated in FIG. 6, the allowance list stores serial IDs of virtual cabinets to which copy is allowed.

The session information list storage section 14b stores a list of copy sessions that are being executed in the system. The session information list storage section 14b stores copy source virtual disks and copy destination virtual disks as copy session information, and stores the copy session information after copy has started.

The control section (processor) 13 includes an internal memory for storing programs specifying various processing procedures and needed data, and executes various processes using these programs and data. The control section 13 controls allotment of virtual disks to the hosts and allocation of real disks of the storage to the virtual disks. The control section 13 controls direct access by any of the hosts to the virtual disk so as to restrict access by any of the hosts to a part of the virtual disks allotted to the any of the hosts in reference to the storage section 14. The control section 13 particularly includes a command receiving section 13a, a copy control section 13b, and a session information list transmitting section 13c.

The command receiving section 13a receives, from the host 20, a copy execution command instructing a copy between virtual disks, or a session information list acquisition command requiring a session information list.

Specifically, upon receipt of the copy execution command, the command receiving section 13a notifies the copy control section 13b of the received copy execution command. Furthermore, upon receipt of the session information list acquisition command, the command receiving section 13a notifies the session information list transmitting section 13c of the received session information list acquisition command.

Upon receipt of the copy execution command from the host 20, the copy control section 13b refers to an allowance list in the allowance list storage section 14a. If a copy between virtual disks in the copy execution command is allowed, the copy control section 13b executes the copy between the virtual disks.

Specifically, upon receipt of the copy execution command from the command receiving section 13a, the copy control section 13b refers to an allowance list stored in the allowance list storage section 14a. Then, the copy control section 13b determines whether a virtual cabinet serial ID to which a copy destination virtual disk specified by the copy execution command belongs, exists among virtual cabinet serial IDs to which copies are allowed in the allowance list.

If the serial ID of the virtual cabinet in the copy execution command does not exist among virtual cabinet serial IDs in the allowance list, the copy control section 13b abandons the copy, and notifies the host 20 that the virtual disk (virtual volume) specified by the copy execution command does not exist. That is, because this copy execution command is a copy execution command for performing a copy to a virtual disk to which a copy is not allowed, the copy control section 13b notifies the host 20 that the virtual disk (virtual volume) does not exist, in order to hide the presence of the virtual disk from the user.

On the other hand, if the serial ID of the virtual cabinet in the copy execution command exists among virtual cabinet serial IDs in the allowance list, the copy control section 13b determines whether the copy session number is within an upper limit value of copy session number stored in the allowance list storage section 14a.

If the copy session number exceeds the upper limit value of copy session number, the copy control section 13b terminates the processing without executing a copy between virtual disks. On the other hand, if the copy session number does not exceed the upper limit value of copy session number, the copy control section 13b starts a copy between virtual disks specified by the execution command, and notifies the host 20 that the copy has been started.

Next, the copy control section 13b stores copy session information in the session information list storage section 14b, as copy information during execution. Then, the copy control section 13b determines whether the copy has been finished. When the copy has been finished, the copy control section 13b notifies the host 20 that the copy has been finished.

Upon receipt of the session information list acquisition command from the host 20, the session information list transmitting section 13c refers to an allowance list stored in the allowance list storage section, and extracts a copy session information list of the virtual disks between which copy is allowed. The session information list transmitting section 13c then transmits the extracted copy session information list to the host 20.

Specifically, upon receipt of the session information list acquisition command from the command receiving section 13a, the session information list transmitting section 13c refers to an allowance list, and extracts the copy session information list of the virtual disks between which copy is allowed. The session information list transmitting section 13c then notifies the host 20 of the extracted copy session information list.

Now, copy control processes are described in detail with reference to FIGS. 7 and 8. Copy processes include, for example, EC (equivalent copy) and REC (remote equivalent copy), and either of which means a function of copying content of a virtual disk to another virtual disk to create a duplicate (replica). If a copy source and a copy destination are the identical virtual cabinet, the copy process is treated as an EC, and if the copy source and the copy destination are virtual cabinets different from each other, the copy process is treated as an REC. Hereinbelow, the case wherein the REC is performed as a copy process is explained in detail.

As illustrated in FIG. 7, for example, a virtual disk B is set in an allowance list of a virtual cabinet A, and therefore, with respect to the virtual cabinet A, an REC command (actuation, stop, interruption, or restart) from a virtual disk of the virtual cabinet A to a virtual disk of the virtual cabinet B can be executed. In this case, the REC command issued to the virtual cabinet A is assumed to be executable in either of the directions A→B and B→A.

That is, the go/no-go determination of execution of the REC is as follows. As illustrated in FIG. 8, since the virtual cabinet B is set in the allowing list of the virtual cabinet A, the REC command can be executed to copy from the virtual disk of the virtual cabinet A to the virtual disk of the virtual cabinet B. Also, since the virtual cabinet A is set in an allowing list of the virtual cabinet B, the REC command can be executed to copy from the virtual disk of the virtual cabinet B to the virtual disk of the virtual cabinet A.

Since nothing is set in an allowance list of a virtual cabinet C, the REC command to copy from a virtual disk of the virtual cabinet C to another virtual disk cannot be executed. Furthermore, since in an allowance list of the virtual cabinet S, all virtual cabinets except the virtual cabinet S itself are set, the REC command can be executed to copy from the virtual disk of the virtual cabinet S to virtual disks of all the virtual cabinets except the virtual cabinet S itself.

A session information list acquisition request is responded to with only REC information on a virtual cabinet that is allowed to perform REC to a virtual cabinet specified by the received session information list acquisition command, and is not responded to with REC information on a virtual cabinet to which REC is not allowed. A session specification information acquisition request is responded to with a session of which the information list cannot be acquired regarded as being nonexistent.

[Processing by Switch]

Figure 9:
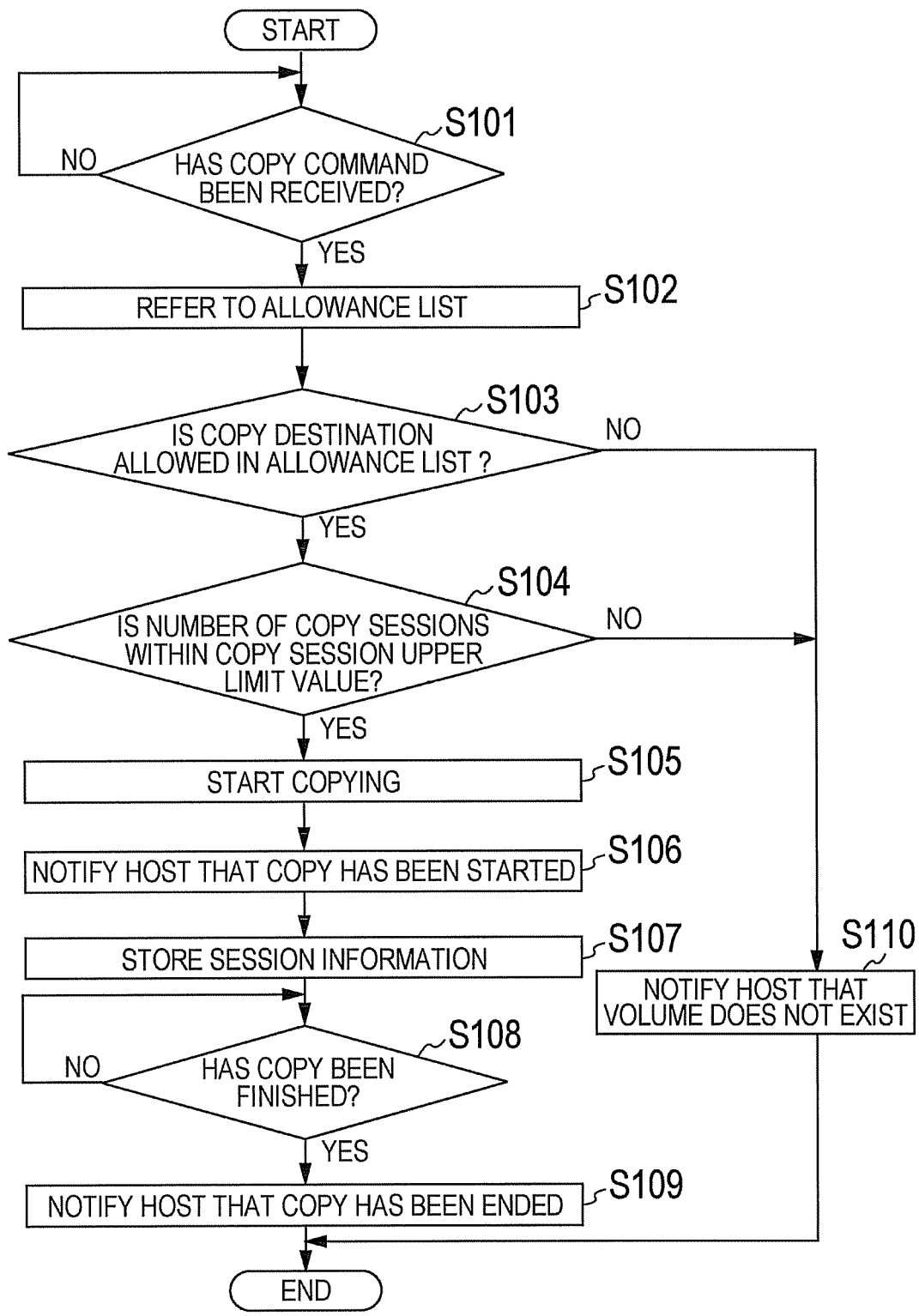
FIG. 9 is a flowchart illustrating copy control processing operations of the switch according to the first embodiment.
Figure 10:
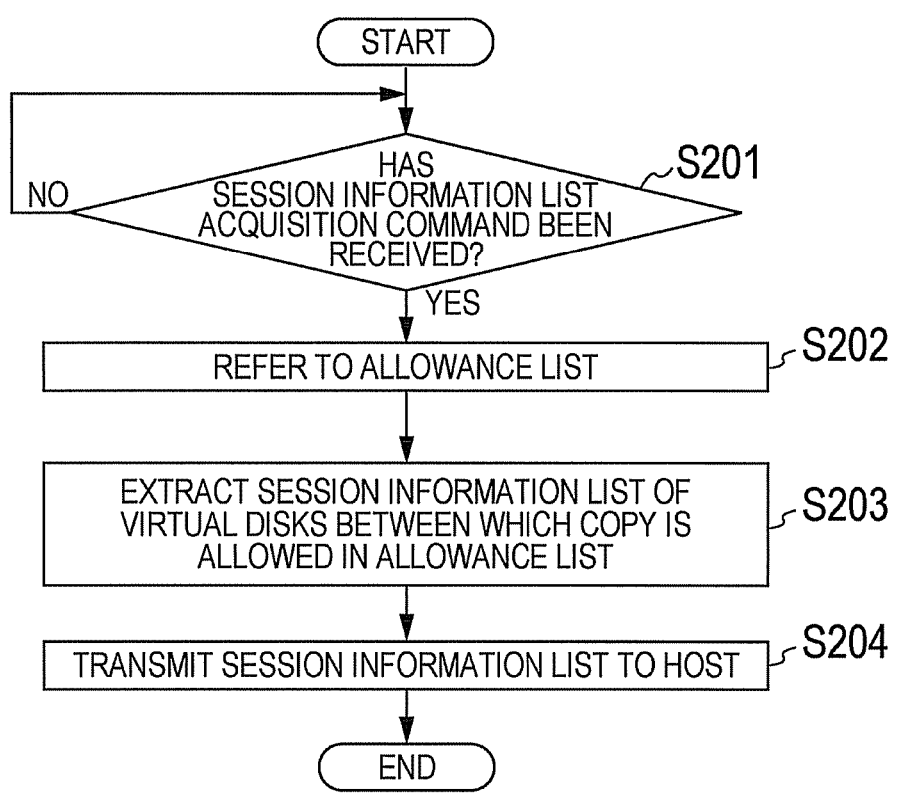
FIG. 10 is a flowchart illustrating session information list notification processing operations of the switch according to the first embodiment.

Next, processing by the switch 10 according to the first embodiment is described with reference to FIGS. 9 and 10. FIG. 9 is a flowchart illustrating copy control processing operations of the switch according to the first embodiment. FIG. 10 is a flowchart illustrating session information list notification processing operations of the switch according to the first embodiment.

As illustrated in FIG. 9, when the switch 10 receives a copy execution command from the host 20 (S101), it refers to an allowance list of the allowance list storage section 14a (S102).

The switch 10 then determines whether a copy between virtual disks in the copy execution command is allowed (S103). Specifically, the switch 10 determines whether a virtual cabinet serial ID to which a copy destination virtual disk specified by the copy execution command belongs, exists among virtual cabinet serial IDs to which copies are allowed in the allowance list.

If a copy between the virtual disks in the copy execution command is not allowed (S103: No), the switch 10 abandons the copy, and notifies the host 20 that the virtual volume specified by the copy execution command does not exist (SIlo).

On the other hand, if a copy between the virtual disks in the copy execution command is allowed (S103: Yes), the switch 10 determines whether the copy session number is within the upper limit value stored in the allowance list storage section 14a (S104).

If the copy session number is not within the upper limit value of copy session number (S104: No), the switch 10 terminates the processing without executing a copy between virtual disks. On the other hand, if the copy session number is within the upper limit value of copy session number (S104: Yes), the switch 10 starts a copy between virtual disks specified by the execution command (S105), and notifies the host 20 that the copy has been started (S106).

Next, the switch 10 stores copy session information in the session information list storage section 14b, as copy information during execution (S107). Then, the switch 10 determines whether the copy has been finished (S108). When the copy has been finished (S108: Yes), the switch 10 notifies the host 20 that the copy has been finished (S109) and terminates the processing.

Now, description is made of session information list notification processing by the switch. As illustrated in FIG. 10, when the switch 10 receives a session information list acquisition command (S201), it refers to an allowance list (S202).

Then, the switch 10 extracts a copy session information list between virtual disks between which a copy is allowed (S203). Thereafter, the switch 10 notifies the host 20 of the extracted copy session information list (S204).

Effects of First Embodiment

As described above, the switch 10 stores allowance lists indicating whether the execution of copies between virtual disks is to be allowed, and receives, from the host 20, a copy execution command instructing the copy between virtual disks. The switch 10 refers to an allowance list stored in the allowance list storage section 14a, and if the copy between the virtual disks in the copy execution command is allowed, the switch 10 can perform control so as to execute the copy between the virtual disks.

Furthermore, according to the first embodiment, if a copy between virtual disks in the copy execution command is not allowed, the switch 10 abandons the copy between the virtual disks, and notifies the host 20 that a destination virtual disk device specified by the copy command does not exist. Since the copy execution command is a copy execution command for performing a copy to a virtual disk to which copy is not allowed, it is possible to hide the presence of the virtual disk from the user by providing the notification to the host 20 that the destination virtual disk device specified by the copy command does not exist.

Moreover, according to the first embodiment, the switch 10 stores, along with allowance list, a copy session upper limit value indicative of an upper limit value of the number of copies executable in parallel between allowed virtual cabinets. Upon receipt of the copy execution command from the host 20, the switch 10 performs control so as to execute copy between the virtual disks unless the copy session number exceeds the copy session upper limit value stored in the allowance list storage section 14a. Thereby, an upper limit value of copy session number actuatable by a virtual cabinet can also be set.

Second Embodiment

In the above-described first embodiment, explanations have been given on the case wherein virtual cabinets between which copy is allowed in an allowance list is set, but the present invention is not limited to this case. In the allowance list, an allowed direction in which copy between virtual cabinets is allowed may also be set along with the virtual cabinets between which copy is allowed.

Accordingly, in a second embodiment of the present invention, the case wherein the allowed direction is set along with virtual cabinets between which copy is allowed is treated. With reference to FIGS. 11 to 14, the configuration and processing of the switch 10 in the second embodiment will be given below.

Figure 11:
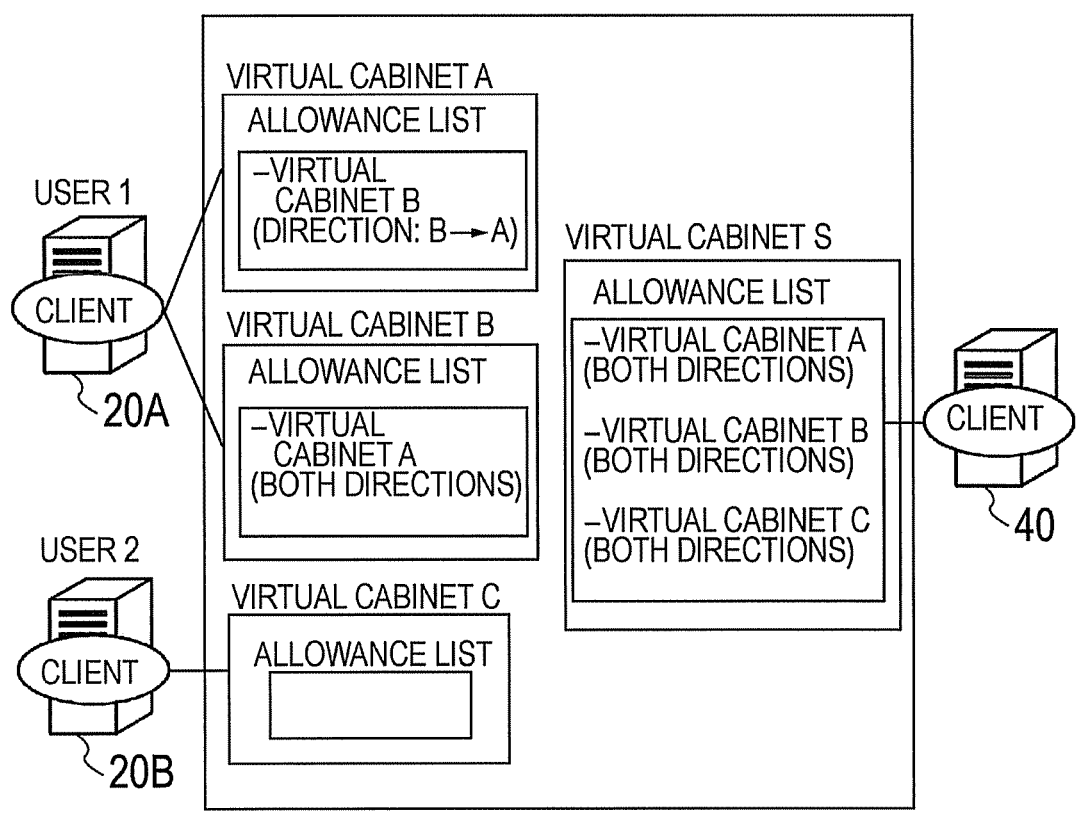
FIG. 11 is a diagram explaining copy control processing by a switch according to a second embodiment of the present invention.

FIG. 11 is a diagram explaining copy control processing by a switch according to the second embodiment. FIG. 12 is another diagram explaining copy control processing by the switch according to the second embodiment. FIG. 13 is a diagram explaining a remote copy allowed virtual cabinet information list. FIG. 14 is a diagram explaining remote copy allowed virtual cabinet information parameters.

As illustrated in FIG. 11, in the switch 10a according to the second embodiment, along with virtual cabinets to which copies are allowed, allowed directions indicating copy go/no-go in copy directions (from copy sources to copy destinations) are set in respective virtual cabinets. That is, since an allowance list of each of the virtual cabinets is provided with directionality, a virtual cabinet that has received a copy execution command will determine execution go/no-go of the copy execution command in accordance with directionality go/no-go of the allowance list.

Specifically, as illustrated in FIG. 11, for example, in the allowance list of the virtual cabinet A, the virtual cabinet B is set and also an REC direction "B→A" is set. In the allowance list of the virtual cabinet B, the virtual cabinet A is set and also REC directions "both directions" are set.

As exemplified in FIG. 12, regarding the REC go/no-go determination is, if the virtual cabinet A receives an REC command, the REC command to instruct copy from the virtual cabinet A to the virtual cabinet B cannot be executed while the REC command to instruct copy from the virtual cabinet B to the virtual cabinet A can be executed. If the virtual cabinet B receives an REC command, the REC is executable in either direction of "A→B" and "B→A".

Here, specific examples of allowance lists stored in the switch will be described with respect to FIGS. 13 and 14. As illustrated in FIG. 13, in the allowance list (allowedSID), as in the case of the first embodiment, serial IDs of virtual cabinets to which copies are allowed are stored, and also "directions" ("dir" in FIG. 13) are stored as allowed copy directions.

As exemplified in FIG. 14, regarding the "direction", its value "0" indicates that copy is allowed in both directions, its value "1" indicates that copy is disallowed in the transmission direction, and its value "2" indicates that copy is disallowed in the reception direction.

In this manner, in the above-described second embodiment, along with an allowance list, at least one allowed direction in which the execution of copy is allowed out of both directions between the copy source and the copy destination is stored. Upon receipt of a copy execution command indicating copy between virtual disks from the host 20, the switch 10 refers to an allowed direction along with an allow list stored in the allowance list storage section 14a. If a direction from the copy destination to the copy source in the copy execution command is allowed as an allowed direction, the switch 10 executes the copy between the virtual disks. Thus, copy control is executable also regarding directions between the copy destination and the copy source, which allows strengthening security.

Third Embodiment

While the present invention has been described as related to the above embodiments, it is to be understood that the present invention may otherwise variously practiced. So, another embodiment in the present invention will be described below as a third embodiment of the present invention.
(Allowance List)
(1) In the above-described first embodiment, explanations have been given on the case wherein an allowance list is held for each virtual cabinet, but this embodiment is not restricted to this case. The allowance list may also be held for each virtual target.

Figure 15:
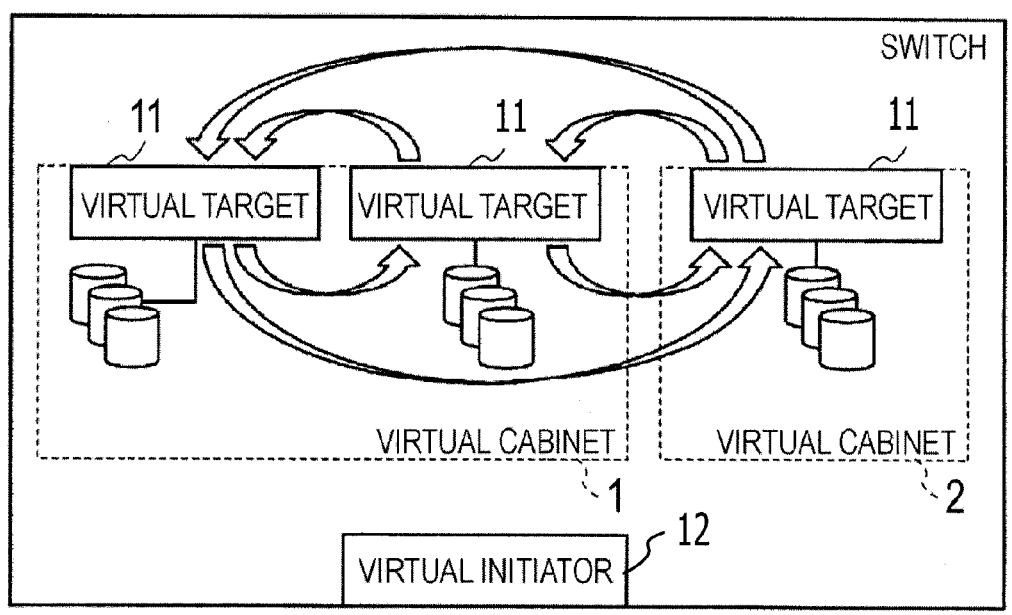
FIG. 15 is a diagram explaining copy control processing by a switch according to a third embodiment of the present invention.
Figure 16:
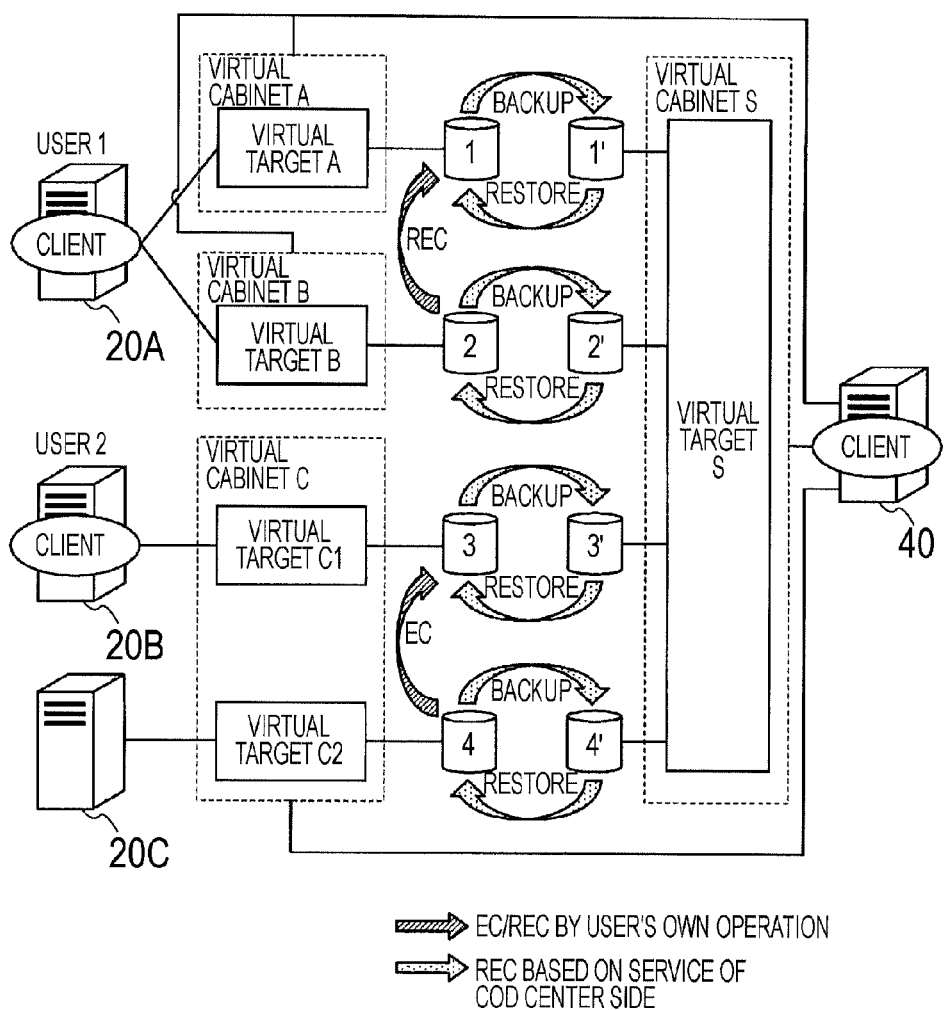
FIG. 16 is a diagram explaining the related art.

Specifically, as illustrated in FIG. 15, in the virtualized switch, the virtual targets 11 are each provided with an allowance list to regulate copy go/no-go between virtual targets 11. A storage system illustrated in FIG. 15 is an example wherein two virtual cabinets are defined, and two virtual targets are created in a virtual cabinet 1 while one target is created in a virtual cabinet 2, and wherein copy go/no-go is regulated between virtual targets 11.

In this way, since copy is controlled for each of the virtual targets, it is possible to make a fine regulation for security, as compared with the case wherein copy is controlled for each of the virtual cabinets.
(2) System Configuration etc.

The components of the devices in the drawings are functional and conceptual and do not necessarily have to be physically configured as illustrated. That is, specific configurations of distribution/integration of the devices are not limited to the configurations in the drawings, and all or some of the configurations can be configured by functionally or physically distributing/integrating in arbitrary units according to various loads or usage statuses, etc. For example, the command receiving section 13a and the copy control section 13b may be integrated. Furthermore, all or arbitrary parts of the processing functions provided by the devices can be realized by a CPU and by programs interpreted and executed by the CPU, or can be implemented as hardware with a wired logic.

Of processes described in the above-described embodiments, all or parts of the processes that are described as being automatically performed can also be manually performed. Alternatively, all or parts of the processes that are described as being manually performed can be automatically performed by known methods. Besides, matters shown in the above descriptions and drawings, such as processing procedures, control procedures, specified notation, and information including various pieces of data and parameters can be arbitrarily changed unless otherwise stated.

The system above described may prevent information leakage between users and data destruction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A switch apparatus connectable between hosts and at least one storage device, the switch apparatus to provide a service of allotting virtual storage areas to be deployed in said at least one storage device to any of the hosts upon demand, the switch apparatus comprising:

a processor to control allotment of the virtual storage areas to the hosts and allocation of physical storage areas of the at least one storage device to the virtual storage areas; and a memory to store information that, for each of the hosts, indicates whether or not the respective host is allowed access to the virtual storage areas, respectively, so that said information is thereby stored in the switch apparatus, wherein the processor allows and restricts access by the hosts to the virtual storage areas in accordance with the information stored in the memory, targets for accessing the virtual storage areas become virtual targets linked to the accessed virtual storage areas, the virtual targets being included in virtual cabinets, the memory stores at least one allowance list indicating virtual cabinets of the virtual cabinets to which copies are allowed by each of the hosts, upon receipt from a host of a request to copy between respective virtual storage areas of the virtual storage areas, the processor determines whether the copy in accordance with the request is allowed by the at least one allowance list, and the processor controls copy between the respective virtual storage areas when the copy in accordance with the request is allowed by the at least one allowance list, the at least one allowance list includes direction information that, for each of the virtual cabinets, indicates directions in which the respective virtual cabinet is allowed access to other virtual cabinets of the virtual cabinets, and the processor determines whether the copy in accordance with the request is allowed by the direction information in the at least one allowance list, and controls copy between the virtual areas in accordance with the determination of whether the copy is allowed by the direction information in the at least one allowance list.

2. The switch apparatus according to claim 1, wherein, when the processor determines that the copy in accordance with said request is not allowed, the processor transmits a notification to the host making the request that a respective virtual storage area of the respective virtual storage areas between which copy was requested does not exist.

3. The switch apparatus according to claim 1, wherein the processor receives a request of a copy sessions list from a respective host, the processor generates the copy sessions list allowed by the at least one allowance list, and the processor transmits to the respective host the generated copy sessions list.

4. The switch apparatus according to claim 1, wherein the memory stores an upper limit value indicative of a number of copies that can be executed in parallel, the processor determines whether a copy session number for the request is within the upper limit value, and the processor starts the copy between virtual storage areas specified by the request when the copy session number is within the upper limit value.

5. A method for controlling a switch apparatus connectable between hosts and at least one storage device, the switch apparatus to provide a service of allotting virtual storage areas to be deployed in said at least one storage device to any of the hosts upon demand, the method comprising:

storing, on the switch apparatus, information that, for each of the hosts, indicates whether or not the respective host is allowed access to the virtual storage areas, respectively;

controlling allotment of the virtual storage areas to the hosts and allocation of physical storage areas of the at least one storage device to the virtual storage areas;

allowing and restricting access by the hosts to the virtual storage areas in accordance with the stored information, wherein targets for accessing the virtual storage areas become virtual targets linked to the accessed virtual storage areas, the virtual targets being included in virtual cabinets;

storing at least one allowance list indicating virtual cabinets of the virtual cabinets to which copies are allowed by each of the hosts;

upon receipt from a host of a request to copy between respective virtual storage areas of the virtual storage areas, determining whether the copy in accordance with the request is allowed by the at least one allowance list, and controlling copy between the respective virtual storage areas when the copy in accordance with the request is allowed by the at least one allowance list, wherein:

the at least one allowance list further includes direction information that, for each of the virtual cabinets, indicates directions in which the respective virtual cabinet is allowed access to other virtual cabinets of the virtual cabinets, and the method further includes determining whether the copy in accordance with the request is allowed by the direction information in the at least one allowance list, and controlling copy between the virtual areas in accordance with the determination of whether the copy is allowed by the direction information of the at least one allowance list.

6. The method according to claim 5, further comprising, when said determining determines that the copy in accordance with the request:

transmitting a notification to the host making the request that a respective virtual storage area of the respective virtual storage areas between which copy was requested does not exist.

7. The method according to claim 5, further comprising:

receiving a request of a copy sessions list from a respective host, generating the copy sessions list allowed by the at least one allowance list, and transmitting to the respective host the generated copy sessions list.

8. The method according to claim 5, further comprising:

storing an upper limit value indicative of a number of copies that can be executed in parallel;

determining whether a copy session number for the request is within the upper limit value; and starting the copy between virtual storage areas specified by the request when the copy session number is within the upper limit value.

* * * * *

UNITED STATES PATENT AND TRADEMARK OFFICE
CERTIFICATE OF CORRECTION

PATENT NO. : 8,762,665 B2
APPLICATION NO. : 12/542927
DATED : June 24, 2014
INVENTOR(S) : Akira Satou et al.

Page 1 of 1

It is certified that error appears in the above-identified patent and that said Letters Patent is hereby corrected as shown below:

On the Title Page Item [30] (Foreign Application Priority Data), Line 1, Delete "2008-222575" and insert -- 2008-222475 --, therefor.

In the Claims

Column 12, Line 33, In Claim 6, Delete "with the request:" insert -- with the request is not allowed: --, therefor.

Signed and Sealed this
Fourth Day of November, 2014

Michelle K. Lee
*Deputy Director of the United States Patent and Trademark Office*